(12) United States Patent
Asa

(10) Patent No.: US 7,999,538 B2
(45) Date of Patent: Aug. 16, 2011

(54) DEVICE AND SYSTEM FOR DETECTING POSITION

(75) Inventor: Yukihiro Asa, Tokyo (JP)

(73) Assignee: Asa Electronic Industry Co., Ltd., Tokyo (JP)

( * ) Notice: Subject to any disclaimer, the term of this patent is extended or adjusted under 35 U.S.C. 154(b) by 594 days.

(21) Appl. No.: 11/629,234

(22) PCT Filed: Apr. 14, 2005

(86) PCT No.: PCT/JP2005/007240
§ 371 (c)(1),
(2), (4) Date: Sep. 19, 2008

(87) PCT Pub. No.: WO2005/124273
PCT Pub. Date: Dec. 29, 2005

(65) Prior Publication Data
US 2009/0015243 A1    Jan. 15, 2009

(30) Foreign Application Priority Data
Jun. 15, 2004 (JP) .................................. 2004-176545

(51) Int. Cl.
*G01V 7/14* (2006.01)
(52) U.S. Cl. ................. 324/207.26; 324/207.2
(58) Field of Classification Search ............. 324/207.26, 324/207.2
See application file for complete search history.

(56) References Cited

U.S. PATENT DOCUMENTS

| 5,231,352 A * | 7/1993 | Huber ..................... 324/207.24 |
| 2003/0042892 A1 | 3/2003 | Nagai et al. |
| 2004/0226183 A1* | 11/2004 | Sielemann ..................... 33/708 |

FOREIGN PATENT DOCUMENTS

| JP | 6-33914 A | 7/1992 |
| JP | 9-152304 A | 11/1995 |
| JP | 2003-156305 | 5/2003 |

OTHER PUBLICATIONS

PCT/JP2005/007240, May 12, 2005, Int'l Search Report.

* cited by examiner

*Primary Examiner* — Reena Aurora
(74) *Attorney, Agent, or Firm* — Kirk D. Wong; Hickman Palermo Truong & Becker LLP

(57) ABSTRACT

To provide a position sensor small enough to be contained in a groove formed in an air cylinder in which minimum stroke for fixing and differential travel are improved [MEANS FOR SOLVING PROBLEMS] The position sensor comprises a Hall IC (50) for turning an electric signal on/off according to the position relative to a magnet provided on the piston of an air cylinder, a resin (60) such as a polyamide resin molded to cover the Hall IC (50), a stainless steel frame (30) defining the orientation and position of the Hall IC (50) in the resin (60), a part (40) fixed to the frame (30) in order to pass a screw for fixing the position sensor (1) to the air cylinder, conductors (18, 20, 22) connected to terminals (24, 26, 28) of the Hall IC (50) by soldering, rubber insulators (12, 14, 16) covering the conductors (18, 20, 22), and a rubber sheath part (10) for bundling the insulators (12, 14, 16).

10 Claims, 7 Drawing Sheets

DEVICE AND SYSTEM FOR DETECTING POSITION

FIELD OF THE INVENTION

The present invention relates to a device and system for detecting position of a piston and others in a cylinder.

BACKGROUND ART

Conventionally, to control position of a piston in an air cylinder, position detecting device has been mounted on the side of air cylinder body such that when the piston is displaced, the position can be detected. Non-patent document 1 shows state where a contact-type sensor and a non-contact-type sensor are mounted on an air cylinder as the above detecting device.

Figure 8:
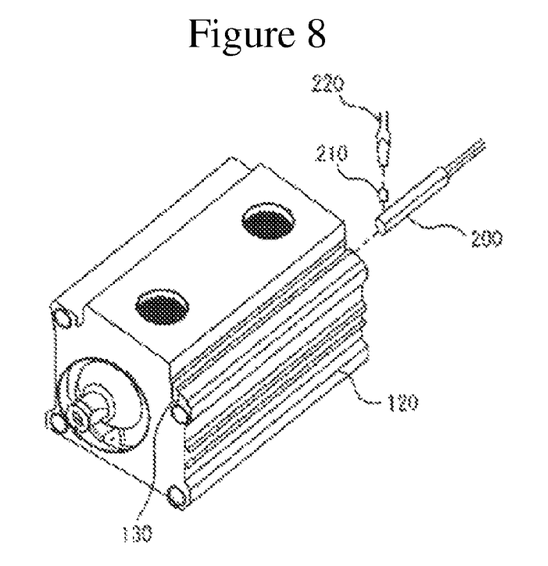
FIG. 8 is a diagram showing mounting contact-type sensor 200 on the air cylinder 120.
Figure 9:
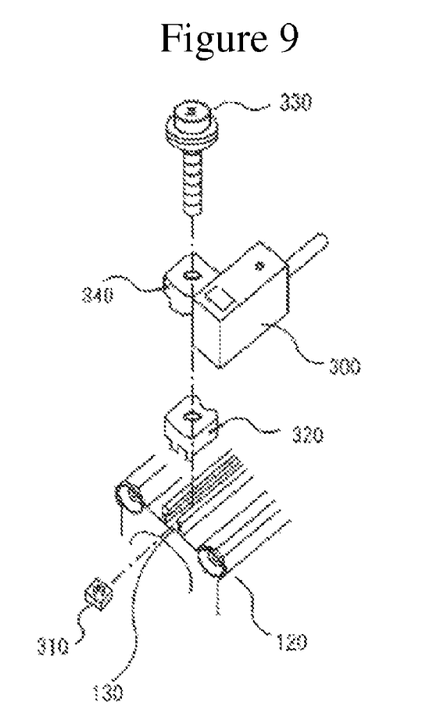
FIG. 9 is a diagram showing mounting the non-contact-type sensor 300 on the air cylinder 120.

FIGS. 8 and 9 are perspective views of the contact-type sensor, the non-contact-type sensor and the air cylinder described in the non-patent document 1. The contact-type sensor consists of magnetoresistive element.

FIG. 8 shows way how contact-type sensor 200 is mounted on air cylinder 120. In particular, approximately cylindrical contact-type sensor 200 is inserted into groove 130 formed on the side of the body of the air cylinder 120. Contact-type sensor 200 is mounted on the air cylinder 120 with setscrew 210 using screwdriver 220.

FIG. 9 shows way how the non-contact-type sensor 300 is mounted on the air cylinder 120. In particular, nut 310 is inserted into the groove 130 formed on the side of the body of the air cylinder 120. Mounting screw 330 is screwed through screw installing section 340 on the side of non-contact-type sensor 30 and spacer 320, to nut 310.

Here, a magnet, placed such that moving direction and magnetic pole direction are parallel, is generally provided on the piston 110 provided in the body of the air cylinder 120. The conventional position detecting device detects position of the piston 110 using this magnet and the sensor 200 or the sensor 300.

In addition, according to the non-patent document 2, mountable minimum stroke of the contact-type sensor 200 is approximately 10 mm and mountable minimum stroke of the non-contact-type sensor 300 is approximately 5 mm. Furthermore, hysterisis of the sensor 200 is approximately 1.5 mm and hysterisis of the non-contact-type sensor 300 is approximately 1 mm.

Non-patent document 1: SMC Corporation catalog Best Pneumatics 2 page 175
Non-patent document 2: SMC Corporation catalog Best Pneumatics 2 page 561

DISCLOSURE OF INVENTION

Problem to be Solved by the Invention

However, conventional contact-type sensor is not preferable with respect to its mountable minimum stroke and hysteresis, even though it is relatively small. On the other hand, non-contact-type sensor is relatively preferable with respect to mountable minimum stroke and hysterisis, although it is large. These sensors have a trade-off relation between size and mountable minimum stroke and hysterisis.

Therefore, for example, in case the operation of the air cylinder needs to be controlled with accuracy, non-contact-type sensor should be used. However, the non-contact-type sensor is relatively preferred with respect to mountable minimum stroke and hysterisis, though it is large. Consequently, it occupies large space. It is necessary to provide screw installing section on non-contact-type sensor. It is necessary to mount non-contact-type sensor on air cylinder using both screw and nut.

Therefore, the purpose of the present invention is to improve mountable minimum stroke and hysterisis, and, to provide a position detecting device small enough to be contained in a groove formed on an air cylinder.

Means for Solving the Problem

To solve the problem above, the position detecting device in the present invention is provided with
first section comprising magnetic body wherein moving direction and boundary of magnetic pole is placed perpendicularly,
member including said first section and second section which is relatively displaced and
position detecting device detecting relative position,
the position detecting device comprising
Hall IC which switches on/off electrical signal output depending on the relative position to the magnetic body, and
resin covering said Hall IC while positioning it inside,
and being mounted such that the switching point of on/off electrical signal output crosses the boundary of the magnetic pole after relative displacement of the first section.

The position detecting device is provided with Hall IC instead of a conventional reed switch and a magnetoresistive element. Hall ICs are superior with respect to magnetic sensitivity, and most of them are small in size. If the Hall IC is set on required direction and position in the position detecting device, it will become possible to detect the position of a piston only by mounting the position detecting device in the manner shown in FIG. 8.

A cavity for containing the Hall IC may be formed in the resin, or, a frame for positioning the Hall IC inside it may be provided in the resin. In case a frame being provided, it is necessary to prevent it from moving from the predetermined position until the resin hardens. So, it is better to form a positioning section which has contact with the inner wall of the mold for covering Hall IC with resin, or, which is able to be nipped between male and female molds. In addition, an opening is formed on the frame near the terminal of Hall IC, which increases validity of insulation of terminal and frame. Furthermore, a through opening is formed to pass resin which is not hardened yet. In this way, by ensuring resin to go around both sides of the frame, sealing of resin and productivity of position detecting device is improved. In particular, by forming the through opening at the end of the frame, the periphery of the through opening will be the positioning section, so the productivity of the position detecting device will increase in that the through opening and positioning section can be formed in one process.

This mounting section includes groove, hole, depression and flat part. In case of using a flat part, adhesive may be used for adhering. In addition, the above member includes automobile, elevator, nursing-care equipment, home security system, cellular phone handset, disconnection detecting system, industrial robot and so on, besides a device wherein the first section is a piston in a cylinder.

DETAILED DESCRIPTION OF THE PREFERRED EMBODIMENT

Figure 1:
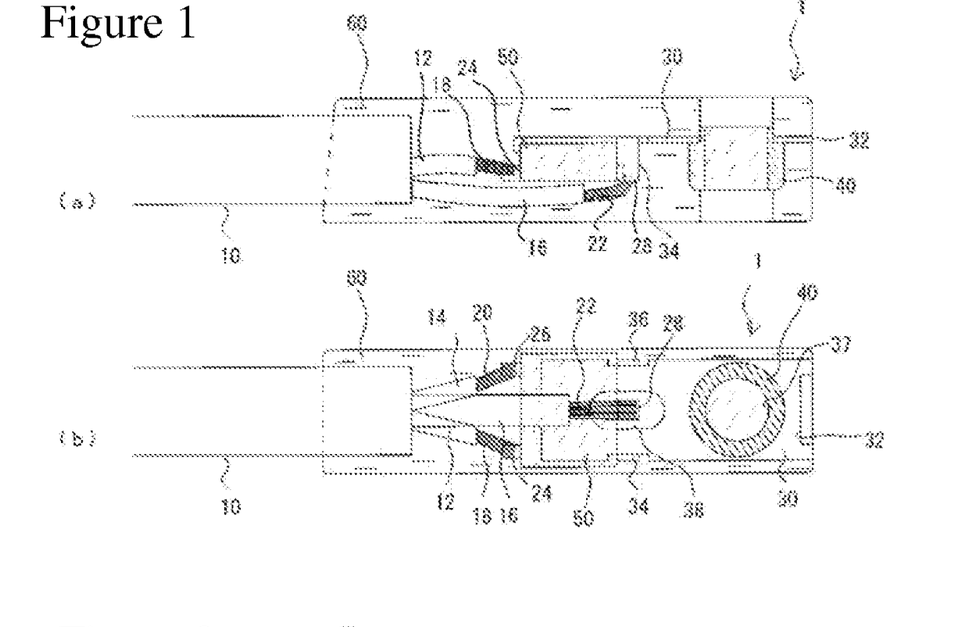
FIG. 1 is a cross-section view and a plane view of the position detecting device 1 in the embodiment of the present invention.

FIG. 1(a) is a cross section view of position detecting device 1 of the embodiment of the present invention. FIG. 1

(b) is a plane view of FIG. 1 (a). The position detecting device 1 detects position of a piston. Air cylinder is generally provided with a magnet in a piston, so that the position of a piston can be detected by means of the magnet and Hall IC provided in the position detecting device 1.

FIG. 1 shows

Hall IC 10 (for example, Product No. EW-462 (Asahi Kasei Electronics)) switching on/off electrical signals depending on relative position to a magnet provided in a piston in the air cylinder, resin 60 covering the Hall IC 50 such as nylon type polyamide resin including hot-melt which is mold formed or others, stainless frame 30 specifying direction and position of the Hall IC 50 in the resin 60 and screw installing section 40, mounted on the frame 30, for installing screw (not shown) for mounting the position detecting device 1 on the air cylinder.

Furthermore, FIG. 1 shows conductor 18, 20 and 22 connected to terminal 24, 26 and 28 of the Hall IC 50 by soldering or others, rubber insulator 12, 14 and 16 coating the conductor 18, 20 and 22 and rubber sheath section 10 including rubber insulators 12, 14 and 16.

As described later, LED and others for informing on-state of the Hall IC 50 can be provided on the position detecting device 1.

Here, the Hall IC 50 is an approximately rectangular solid, for example, with 3.0±0.1 mm body length in the horizontal direction in FIG. 1 (b), 3.6±0.1 mm body width in the vertical direction in FIG. 1 (b) and 1.2±0.1 mm thickness (vertical direction in FIG. 1 (c)). Resin 60 has, for example, a diameter of 3.9 φ and length of 1.5 cm. Screw installing section 40 has, for example, a base with 3 φ outside diameter, an upper surface with 2.3 φ outside diameter and 2 φ inside diameter. Sheath section 10 is 2.8 φ.

A groove with a diameter of approximately 4.0 φ-4.2 φ and an integrally formed opening close to said groove are formed on the side of the air cylinder in the long side direction in general. Position detecting device 1 in the present invention has a diameter of, for example, 3.9 φ, which is able to be mounted in this groove.

Figure 2:
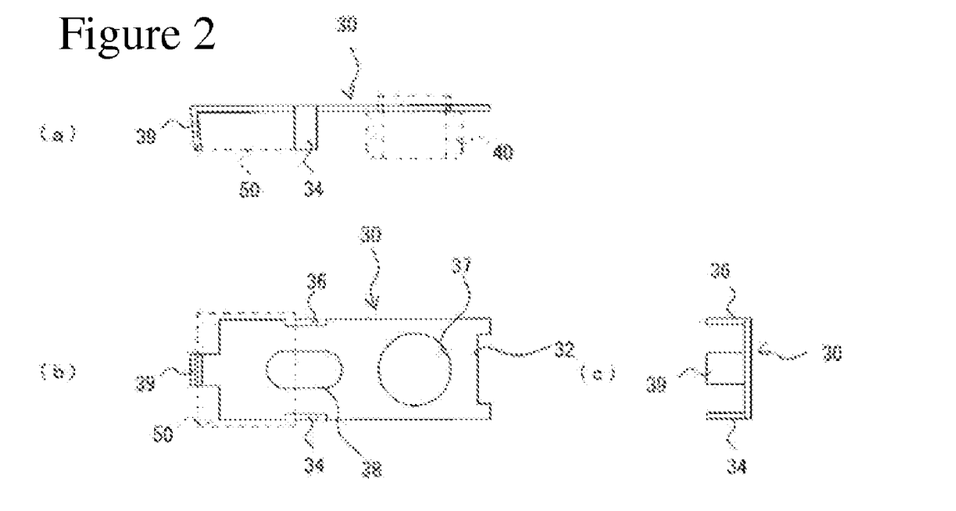
FIG. 2 is a detailed view of the frame 30 shown in FIG. 1.

FIG. 2 is a detailed view of the frame 30 shown in FIG. 1. FIG. 2 (a) is a side view of the long side direction of the frame 30, FIG. 2 (b) is a plane view of the frame 30 and FIG. 2 (c) is a side view of the short side direction of the frame 30.

Approximately elliptic opening 38 placed near terminal 28 of the Hall IC 50, round through hole 37 provided close to the opening 38, where the screw installing section 40 can be mounted, rectangular passing section 32 provided on one end of the frame 30, where the resin 60 passes before hardening, positioning sections 33 and 35, placed on both sides of passing section 32, in contact with the inner wall of mold (not shown) and grippers 39, 34 and 36, respectively provided near the other end and the opening 38 of the frame 30, which position the horizontal direction of Hall IC 1 in FIG. 2 (b) are formed on the frame 30.

Opening 38 ensures insulation of terminal 28 and the frame 30 when terminal 28 and the conductor 22 are solder connected. By forming through hole 37 combined with the screw installing section 40, the position detecting device 1 will able to be mounted on the air cylinder with a screw. The screw installing section 40 and through hole 37 is connected by, for example, laser welding.

By forming passing section 32, the resin 60 before hardening is ensured to go around both sides of the frame 30, the resin 60 is able to be mold-formed efficiently and productivity of the position detecting device 1 increases. The Hall IC 50 is gripped between sides of grippers 34 and 36 on gripper 39 side and inside of the gripper 39. The gripper 39 is bent 83-85 degrees to the frame body so as to grip the Hall IC, which create springiness. Adhesive may be applied between the frame 30 and the Hall IC to specify the vertical position of the Hall IC 50 on the frame 30 in FIG. 2(b).

Positioning sections 33 and 35 may be formed, for example, on the base of the frame. Furthermore, direction and position of the Hall IC 50 may be provided by a projection formed in the screw installing section 40 in mold, with positioning section 33 and 35.

Here, the body of the frame 30 is, for example, 9.48 mm in the long side direction, 3.2 mm in the short side direction and 0.2 mm in thickness. The diameter of through hole 37 is 2.3 φ. Opening 38 is 2.4 mm in the long side direction and 1.2 mm in the short side direction. Passing section 32 is 0.4 mm×3.1 mm. Gripper 39 is 1.4 mm in height×1 mm in width. Grippers 36 and 38 are 1.4 mm in height×0.7 mm in width. Positioning sections 33 and 35 are 0.5 mm in width×0.4 mm in length.

Each of the above dimensions of the frame 30 depend on shape and size of the Hall IC 50, mounting position (for example, groove on the side of the air cylinder) of the position detection device 1, and so on. Those dimensions are not limited to the above-mentioned amounts.

In addition, direction of the Hall IC 50 is, for example, sensor section 52 (FIG. 6) of the Hall IC 50 is placed in a direction perpendicular to the long length direction of the position detecting device 1. In this case, the Hall IC 50 may be faced either up or down. Placed in this direction, for example, setting is completed only by inserting the position detecting device 1 into the groove on the side of piston and fixing it with screw or others. Direction of magnetic poles of magnet and moving direction of the piston is the same in general. Furthermore, north pole is placed on the side where the air cylinder is stretched and south pole is placed on the side where the air cylinder is compressed.

Figure 3:
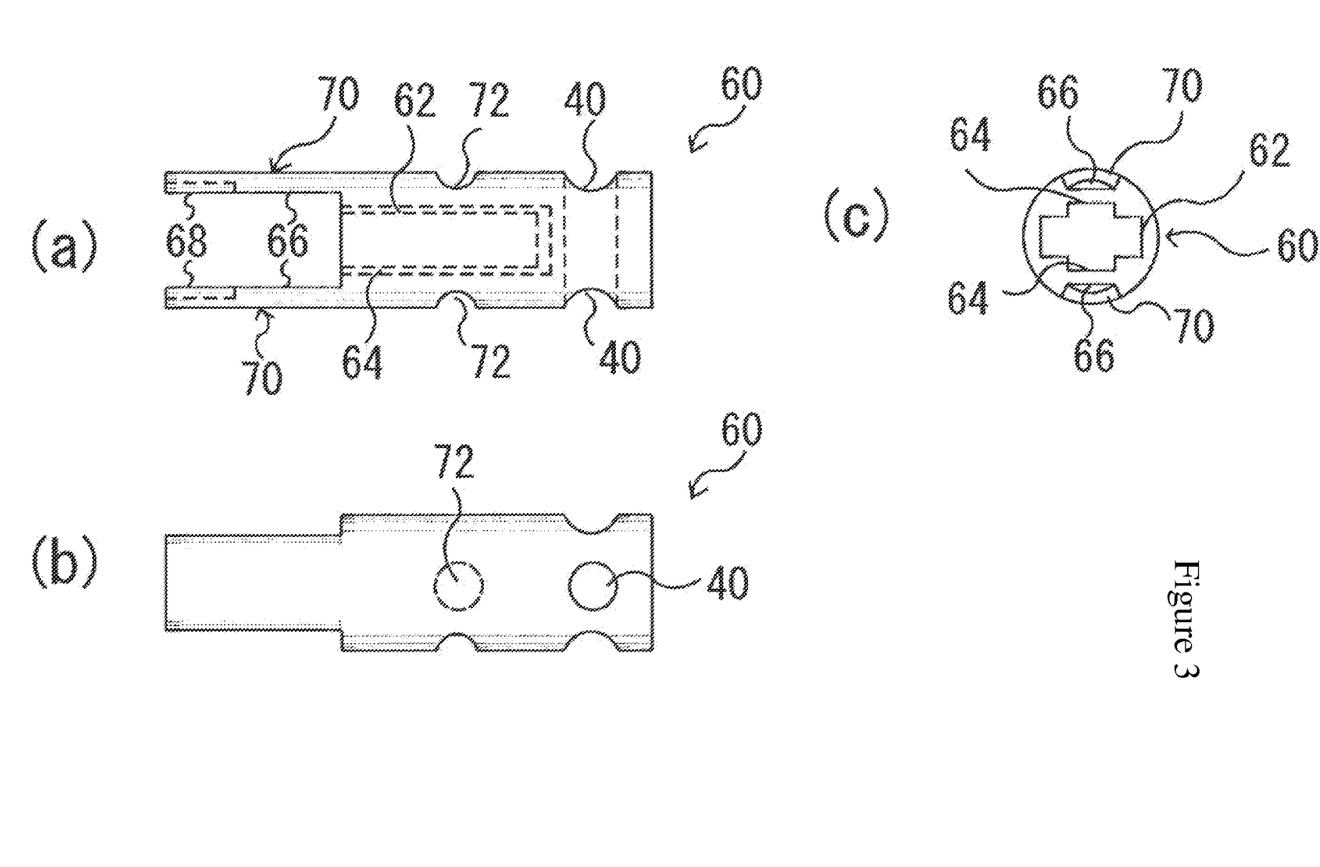
FIG. 3 is a diagram showing an example deformation of the resin 60 of the position detecting device 1 shown in FIG. 1.

FIG. 3 shows an example deformation of the resin 60 of the position detecting device 1 shown in FIG. 1. FIG. 3 (a) is a side view of the resin 60 in the long side direction, FIG. 3 (b) is a plane view of the resin 60 and FIG. 3 (c) is a side view of the resin 60 in the short side direction. Same parts are assigned with the same signs in FIG. 1 and FIG. 3.

The resin 60, for example, polyamide resin containing approximately 10-30% of glass fiber is polybutylene terephthalate (PBT) resin, which provide strength. Screw installing section 40 is formed on the resin 60, as shown in FIG. 1.

Figure 4:
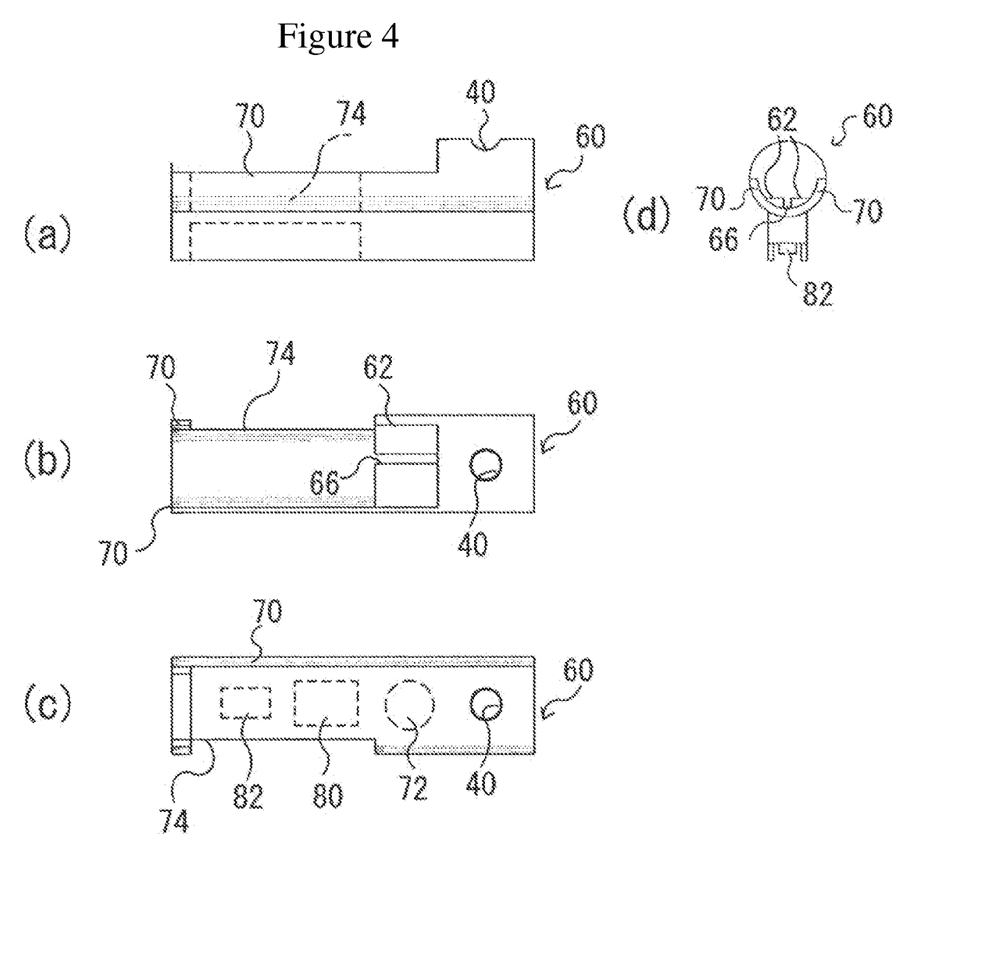
FIG. 4 is a diagram showing an example deformation of the resin 60 different from FIG. 3.

As shown in FIG. 3 (a), cavity 62 for containing the Hall IC 50 is formed close to the screw installing section 40. The cavity 62 containing the Hall IC 50 and little space has the shape of approximately rectangular solid. Resin 60 shown in FIG. 3 and FIG. 4 is smaller than the Hall IC 50 of the already described size. Approximately 3.0 mm length already described is reduced to approximately 2.2 mm, approximately 3.6 mm width to approximately 3.3 mm and approximately 1.2 mm thickness to approximately 1.0 mm in particular.

As shown in FIG. 3 (a) and FIG. 3 (c), cavity 64 and recess 66 to contain the conductor 22 are formed from the upper side to the lower side of the cavity 62. Cavity 64 and the recess 66 have the shape of approximately rectangular solid here, though they may have the shape of approximately semicircle.

A pair of holding piece 70 is formed near the cavity 64 and the recess 66 at the end of cavities 62 and 64. The holding piece 70 includes insulator holder 66 holding insulator 12, 14 and 16 and sheath section holder 68 holding the sheath section 10. Long side cross-section of the resin 60 of the insulator holder 66 has the shape of approximately semicircle. Long side cross-section of the resin 60 of sheath section holder 68 has a rainbow shape.

Marking section 72, one of which shows south pole and another of which shows north pole, is formed between the holding piece 70 and the screw installing section 40. The marking section 72 makes it easier for users to view which direction the position detecting device 1 should be set on the groove on the cylinder when using the position detecting device 1.

Here is the production process of the position detecting device 1 using the resin 60. First, conductors 18, 20 and 22 are connected to terminals 24, 26 and 28 on the Hall IC 50 by soldering or others. Then, according to the mark of the marking section 72, the Hall IC 50 is set in the direction and inserted into the cavity 62 of the resin 60.

Consequently, the Hall IC 50 is contained and positioned in the cavity 62. In addition, the conductor 22 and the insulator 16 are contained in the cavity 64. Furthermore, insulators 12, 14 and 16 are held at insulator holder 66 of the holding piece 70 and the sheath section 10 is held at sheath section holder 68. Then, space between the holding piece 70 and around it is covered with hot-melt resin such as polyamide resin not including glass fiber. Position detecting device 1 is thus produced.

FIG. 4 shows another example using different type of resin 60. FIG. 4 (a) is a side view of the resin 60 in the long side direction, FIG. 4 (b) is a plane view of the resin 60, FIG. 4 (c) is a base view of the resin 60 and FIG. 4 (d) is a side view of the resin 60 in the short side direction. Same parts are assigned with the same signs in FIG. 1 and FIG. 4.

The position detecting device 1 is not equal to that in FIG. 3, being provided with the LED 80 which emits light when electrical signal outputted from the Hall IC 50 is on-state. The resin 60 is also polyamide resin containing approximately 10-30% of glass fiber, polybutylene terephthalate (PBT) resin. Upper part of the cavity 62 in FIG. 4 (a) is cut off, compared to that in FIG. 3 (a). The conductor 22 passes through this cut-off part.

Here, the holding piece 70 is U-shaped as shown in FIG. 4 (d). As shown in FIG. 4 (b), notch 74 for passing conductor connecting, for example, positive terminal and output terminal on the Hall IC 50 and the LED 80, is formed on the holding piece 70.

As shown in FIG. 4 (c), the LED 80 and resistor 82 can be mounted on the base of the position detecting device 1 close to notch 74. The LED 80 and the resistor 82 are electrically connected in series each other. The LED 80 and the resistor 82 are chip-shaped to reduce size and weight.

Marking section 72 showing whether the position detecting device 1 is for south pole/north pole is formed between the holding piece 70 and the screw installing section 40. Here, the resin 60 shown in FIG. 3 is able to fix, even if the marking section 72 showing south pole in the groove 130 of the air cylinder is on the opening side of the groove 130, or, if the marking section 72 showing north pole is on the opening side of the groove 130, because the outline of the resin 60 is approximately cylinder. However, the resin 60 shown in FIG. 4 is provided with the LED 80, so it is necessary to place this part in the opening of the groove 130. Therefore, in the production process of the position detecting device 1, whether it is for north pole/for south pole is uniquely determined by the direction of the Hall IC 50 set in the cavity 62.

Figure 5:
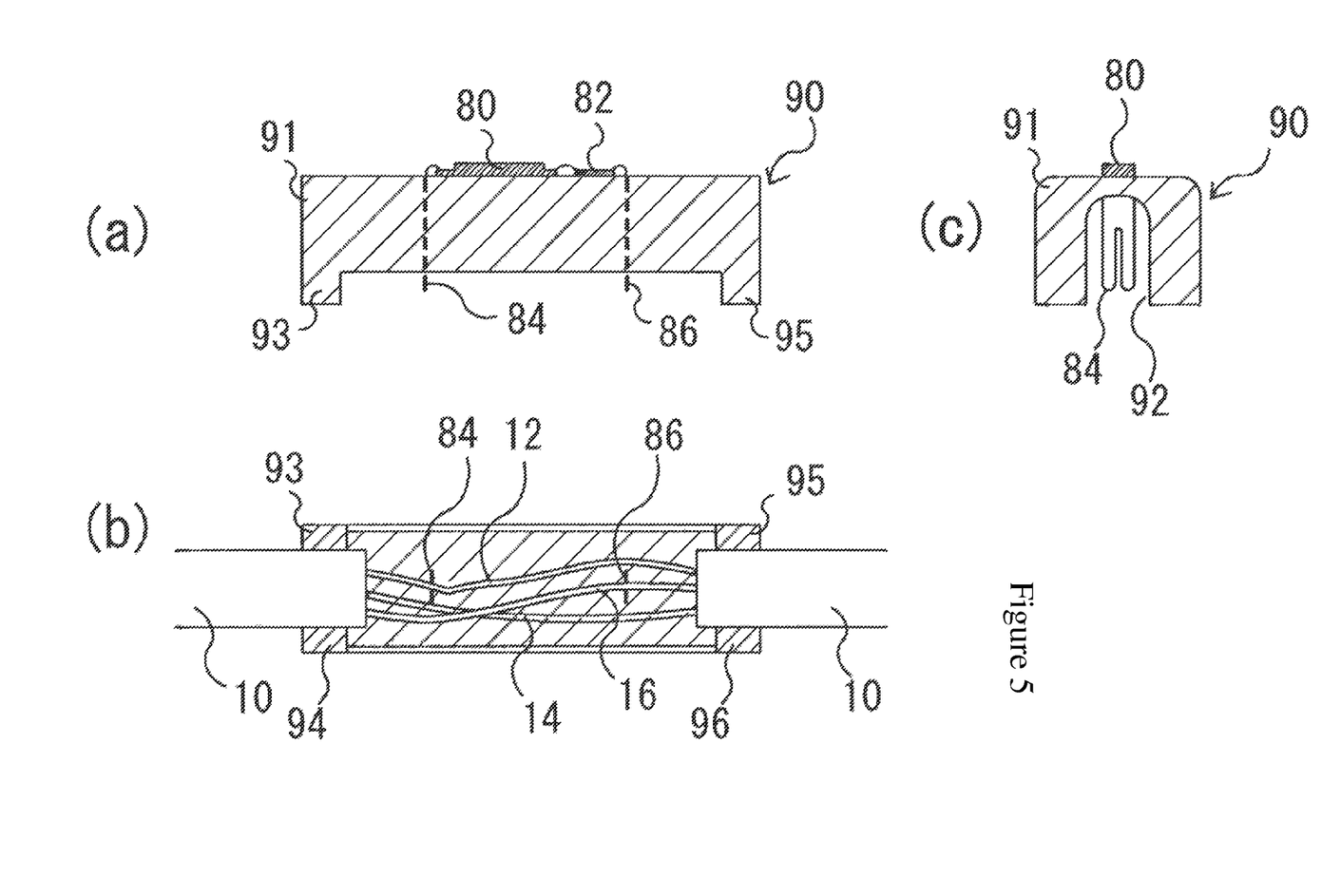
FIG. 5 is a typical diagram of member 91 of the indicator light body 90 suited to using the resin 60 shown in FIG. 3.

FIG. 5 is a typical diagram of member 91 of indicator light body 90 suited to using the resin 60 shown in FIG. 3 or others. FIG. 5 (a) is a side view of the long side direction of member 91 of the indicator light body 90. FIG. 5 (b) is a base view of member 91 of the indicator light body 90 and FIG. 5 (c) is a side view of the short side direction of member 91 of the indicator light body 90. Same parts are assigned with the same signs in FIG. 5 and FIG. 4 or other figures.

This kind of indicator light is effective, for example, when LED cannot be set on the position detecting device 1 because of the size of the groove 130 of the air cylinder or others. In addition, this is effective when it is difficult to see mounting position of the position detecting device 1.

Here, member 91 of the indicator light body 90 shown in the figure is covered by resin. This resin has, for example, a plane base and an arch-like cross-section perpendicular to the long side direction. In the present embodiment, this resin is a mixture of black hot-melt and transparent hot-melt at the rate of, for example, 1:2-2:1. This kind of resin is blackish translucent. That is to say, black hot-melt serves as a diffuser.

In this case, assuming that the LED 80 is a red LED, emitted light diffuses inside translucent hot-melt. Consequently, emission of the LED 80 was visible when indicator light was viewed from the horizontal direction.

Emission color of the LED 80 and hot-melt color are not limited to the above case, and blue LED or green LED, or, yellow hot-melt including buff yellow one or white hot-melt can be used. In particular, emission color of the LED 80 and hot-melt color should be complementary colors or colors dose to them.

As shown in FIG. 5 (a), the LED 80 and the resistor 82 are placed on the upper surface of member 91 of indicator light. These are electrically series-connected by soldering or others. Each of the other end of indicator light 80 and the resistor 82 are respectively connected to notch contacts 84 and 86 by soldering or others.

Notch section is placed in the lower part of the notch contacts 84 and 86. The lower end of the notch section is wide, though the other parts are approximately half of the dimensions of the inside diameters of insulator 12, 14 and 16, that is, approximately half of the dimensions of the outside diameters of the conductor 18, 20 and 22. Consequently, by pressing the conductor 18 and others covered with insulator 12 and others into notch section, insulator 12 and others are disconnected by notch section, the notch contact 84 and others, the conductor 18 and others come in contact with each other and these are electrically connected. In this case, the conductor is pressed by notch section which is smaller than the outside diameter of conductor and deformed longer and thinner. In this way, using the above notch contact 84 and 86, the notch contact 84 and others and the conductor 18 and others are electrically connected without a process where the insulator 12 is cut by a nipper or others.

In addition, as shown in FIG. 5 (c), an arch-like sheath holder 92 for holding sheath 10 is formed on member 91 of the indicator light. The sheath 10 is gripped by sheath holder 92 as shown in FIG. 5 (b). Here, prior to said gripping, the sheath 10 itself is divided and the divided part is placed between the sheath holder 92. In this way, as stated above, the notch contact 84 and others and the conductor 18 and others are electrically connected.

Figure 6:
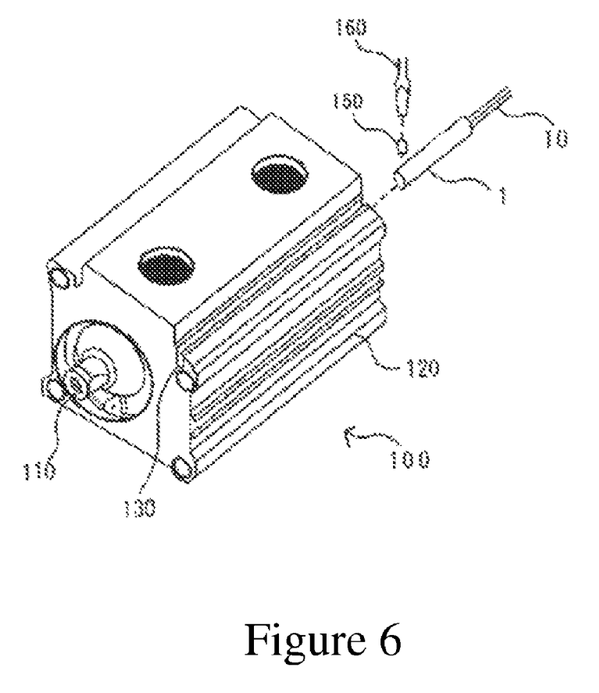
FIG. 6 is a typical diagram of position detecting system 100 including the position detecting device 1 shown in FIG. 1.

FIG. 6 is a typical diagram of position detecting system 100 including the position detecting device 1 shown in FIG. 1 and others. Position detecting system 100 shows the position detecting device 1, the piston 110 which is the first section and the body of the air cylinder 120 which is the second section including the piston 110.

Groove 130, where the position detecting device 1 is mounted, is formed on the body of the air cylinder 120. A hole or a depression may be formed instead of the groove 130. Furthermore, the position detecting device 1 may be adhered on the body of the air cylinder 120 with adhesive or others.

Here is the production process of the position detecting system. First, the position detecting device 1 is inserted into the groove 130 formed on the side of the body of the air cylinder 120. Then, the setscrew 150 is installed into the screw installing section 40 provided on the position detecting device 1 using screwdriver 160. In this way, tip of the setscrew 150 hits the base opposing to the opening of the groove 130, the position detecting device 1 body is pressed by the inner wall close to the opening of the groove 130 and mounted on the body of the air cylinder 120.

Figure 7:
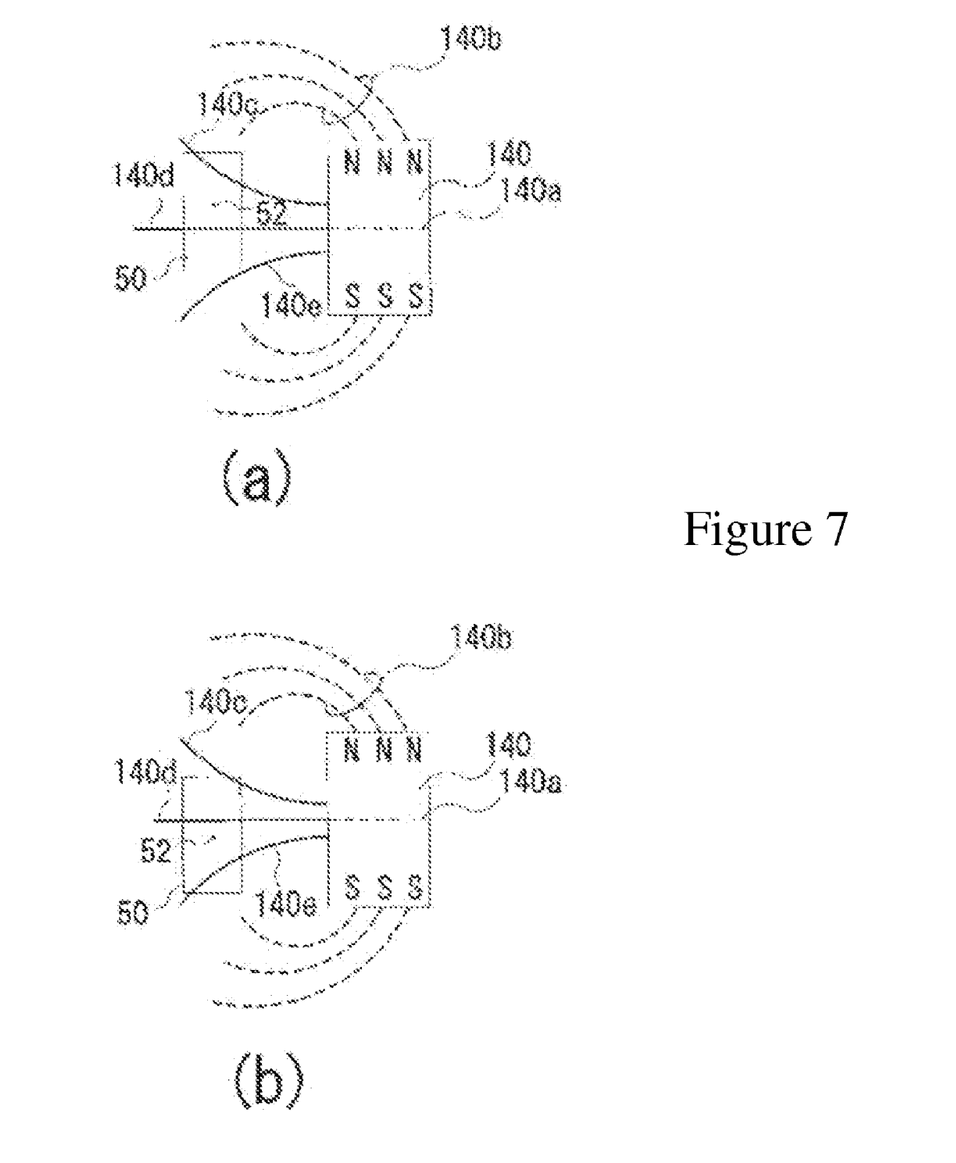
FIG. 7 is a principle explanatory diagram of position detecting in position detecting system 100.

FIG. 7 is a principle explanatory diagram of position detecting in position detecting system 100. FIG. 7 (a) shows the magnet 140 provided on the piston 110 before displacement and FIG. 7 (b) shows the magnet 140 after displacement. Magnet 140 is displaceable in the magnetic pole direction and set such that the boundary of north and south poles crosses the sensor section 52 of the Hall IC 50 after displacement. The sensor section 52 is a switching point of on/off electrical signal output of the Hall IC 50.

There is magnetic field line 140b around the magnet 140 connecting south pole and north pole with a curved line. In addition, there are isodynamic lines 140c-140e around the magnet 140 where magnetic force passes the same point. Each isodynamic lines 140c-140e and each magnetic field line 140b cross each other at right angles. Isodynamic line 140d is, for example, 0 gauss and isodynamic line 140c and 140e are, for example, respectively 25 gauss. Departing from the boundary of south and north poles of the magnet 140 to each magnetic pole, intensity of magnetic force of isodynamic lines increases in general.

As shown in FIG. 7 (a), before displacement of the magnet 140, isodynamic side 140d is placed on the lower side of the sensor section 52 of the Hall IC 50. In this case, the Hall IC 50 is off-state and electrical signal from the Hall IC turns off.

At the same time, as shown in FIG. 7 (b), after displacement of the magnet 140, isodynamic side 140d is placed on the upper side of the sensor section 52 in the Hall IC 50. In this case, the Hall IC 50 is on-state and electrical signal from the Hall IC turns on. Then, when the magnet 140 returns to the state before displacement, electrical signal switches off again.

When the direction of the Hall IC 50 is reversed, electrical signal from the Hall IC 50 turns on as shown in FIG. 7 (a) and electrical signal from the Hall IC 50 turns off as shown in FIG. 7 (b).

According to our experiment by blowing air to the body of the air cylinder 120 and moving the piston 110 with the position detecting device 1 mounted on the body of the air cylinder 120, the mountable minimum stroke of the position detecting device 1 was found to be within 1 mm. As described above, the mountable minimum stroke of the conventional contact-type detecting device is approximately 10 mm and the mountable minimum stroke of the non-contact-type detecting device is approximately 5 mm. Furthermore, when moving the piston 110 to the position where the Hall IC 50 is turned on and bringing the piston 110 back to the position where Hall IC is turned off, hysterisis was approximately 0.1 mm. As described above, the conventional contact-type detecting device has a hysterisis of approximately 1.5 mm and the non-contact-type detecting device has a hysterisis of approximately 1 mm. In this way, the position detecting device 1 was dramatically improved in sensitivity compared to the conventional detecting device.

In the present embodiments, mounting the position detecting device 1 on the body of the air cylinder 120 was taken as an example, but it should be noted that the position detecting device 1 can be mounted on an automobile, an elevator, a nursing-care equipment, a home security system, a cellular phone handset including folding type one, a disconnection detecting system, an industrial robot and so on provided with a magnet or with a built-in magnet.

The present invention may be applied not only to examples explained in embodiments 7 and 8 but also to the following examples:
  a door switch which detects opening/closing of an automobile door
  an elevator system which controls stop positions of an elevator
  a position control system of an arm which controls the position of robot arms and others of industrial machines or nursing devices
  a disconnection detection system which detects the disconnection of piano wires and others
  mutually detecting opening/dosing the members of a folding-type cellular phone handset
  detection of pushing buttons on a cellular phone handset, etc.

INDUSTRIAL APPLICABILITY

The present invention relates to position detecting device and position detecting system applicable to cylinder, automobile, elevator, nursing-care equipment, home security system, cellular phone handset, disconnection detecting system, industrial robot and so on.

EXPLANATION OF SIGNS 1 position detecting device
10 sheath section
12, 14, 16 insulator
18, 20, 22 conductor
24, 26, 28 terminal
30 frame
40 screw installing section
50 Hall IC
52 sensor section 60 resin
100 position detecting system
110 piston
120 air cylinder
130 groove
140 magnet
150 setscrew
160 screwdriver

The invention claimed is:

1. A position detecting system comprising:
a member including a first section comprising a magnetic body and a second section which is relatively displaced to said first section; and
a position detecting device, mounted on the second section, detecting relative position to the magnetic body, said position detecting device comprising:
a Hall IC which switches on/off electrical signal output depending on the relative position to the magnetic body; and
resin covering said Hall IC so as to position it inside said position detecting device;
wherein the first section is mounted such that the switching point of on/off of electrical signal output crosses the boundary of the magnetic pole after relative displacement.

2. The position detecting system according to claim 1, wherein a cavity for containing the Hall IC is formed.

3. The position detecting system according to claim 1, provided with a frame for positioning the Hall IC inside the resin.

4. The position detecting system according to claim 3, wherein a positioning section having contact with mold for covering the Hall IC with the resin is formed on the frame.

5. The position detecting system according to claim 4, wherein a through opening for passing the resin before hardening is formed on the frame.

6. The position detecting system according to claim 4, wherein grippers that position the Hall IC horizontally are formed on the frame.

7. The position detecting system according to claim 3, wherein a through opening for passing the resin before hardening is formed on the frame.

8. The position detecting system according to claim 3, wherein grippers that position the Hall IC horizontally are formed on the frame.

9. The position detecting system according to claim 1, wherein a mounting section is formed outside the second section and the position detecting device is formed such that its size corresponds to one of the mounting section.

10. The position detecting system according to claim 1, wherein the member is mounted on any one of: a cylinder, an automobile, an elevator, a nursing-care equipment, a home security system, a cellular phone handset, a disconnection detection system or an industrial robot.

* * * * *